United States Patent
Rasche et al.

(12) 
(10) Patent No.: US 6,230,922 B1
(45) Date of Patent: May 15, 2001

(54) COMPOSITE PRESSURIZED CONTAINER WITH A PLASTIC LINER FOR STORING GASEOUS MEDIA UNDER PRESSURE

(75) Inventors: Christian Rasche, Bochum; Steffen Rau, Düsseldorf, both of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/554,473

(22) PCT Filed: Nov. 12, 1998

(86) PCT No.: PCT/DE98/03422

§ 371 Date: May 10, 2000

§ 102(e) Date: May 10, 2000

(87) PCT Pub. No.: WO99/27293

PCT Pub. Date: Jun. 3, 1999

(30) Foreign Application Priority Data

Nov. 14, 1997 (DE) .............................................. 197 51 411

(51) Int. Cl.[7] .................................................. F16L 17/067

(52) U.S. Cl. ..................... 220/586; 220/592; 220/592.25; 220/589

(58) Field of Search ................................... 220/586, 588, 220/589, 590, 591, 592, 582, 592.25

(56) References Cited

U.S. PATENT DOCUMENTS

| | | | | |
|---|---|---|---|---|
| 5,476,189 | * | 12/1995 | Duvall et al. | 220/589 |
| 5,938,209 | * | 8/1999 | Sirosh et al. | 220/589 |
| 6,089,399 | * | 7/2000 | Felbaum et al. | 220/586 |
| 6,145,692 | * | 11/2000 | Cherevatsky | 220/586 |

FOREIGN PATENT DOCUMENTS

| | | | |
|---|---|---|---|
| 19631546 | * | 11/1997 | (DE) . |
| 0550951A | * | 7/1993 | (EP) . |
| 0753700A | * | 1/1997 | (EP) . |
| 2744517A | * | 8/1997 | (FR) . |

* cited by examiner

Primary Examiner—J. Moy
(74) Attorney, Agent, or Firm—Cohen, Pontani, Lieberman & Pavane

(57) ABSTRACT

A composite pressure vessel for storing gaseous media under pressure, having a plastic liner two neck pieces arranged in the neck region, and a winding of a fiber composite material that reinforces the liner. In the neck piece that accommodates the valve there is provided a clamping ring which can be screwed into the neck piece and has on the outer circumference a threaded section which is adjoined by a thread-free, frustoconical section. A groove is arranged between internally threaded sections of the neck piece to accommodate a sealing ring and extends radially into the neck piece. On the outside of the respective neck piece, in the region adjoining the collar, provision is made to arrange at least one bead which extends radially outward over the entire circumference.

15 Claims, 4 Drawing Sheets

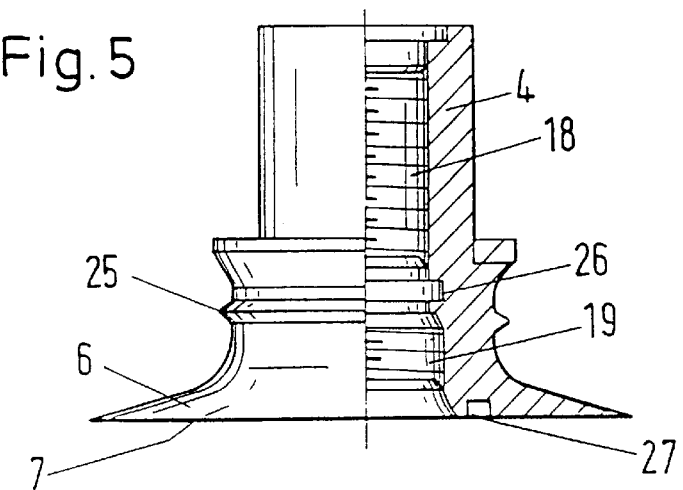
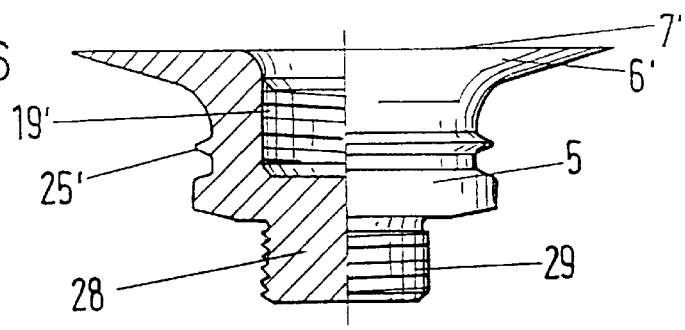
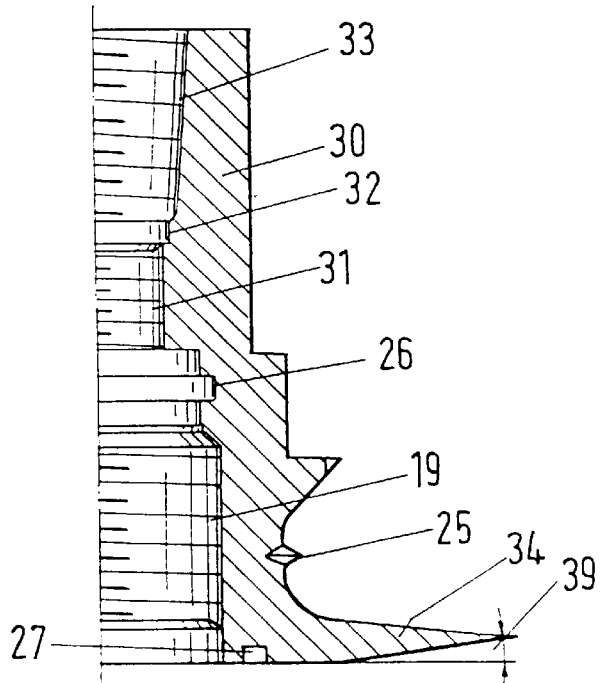

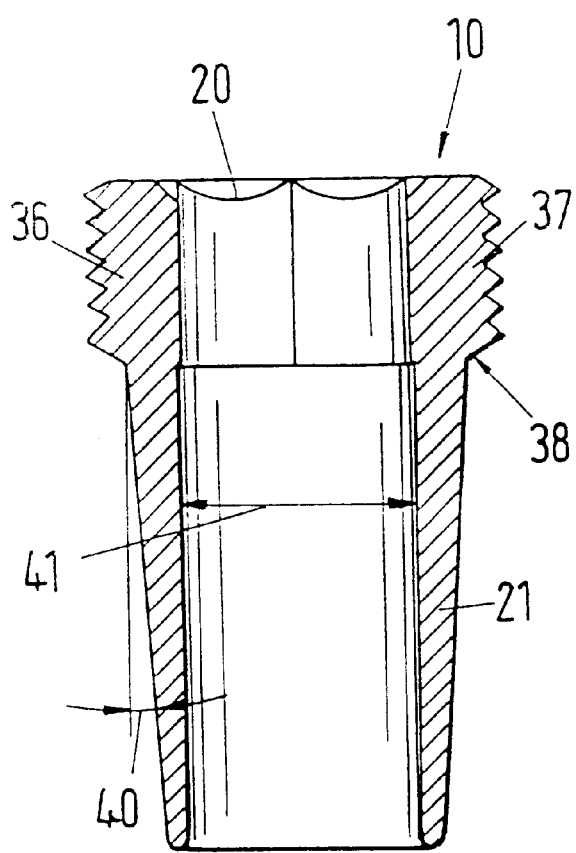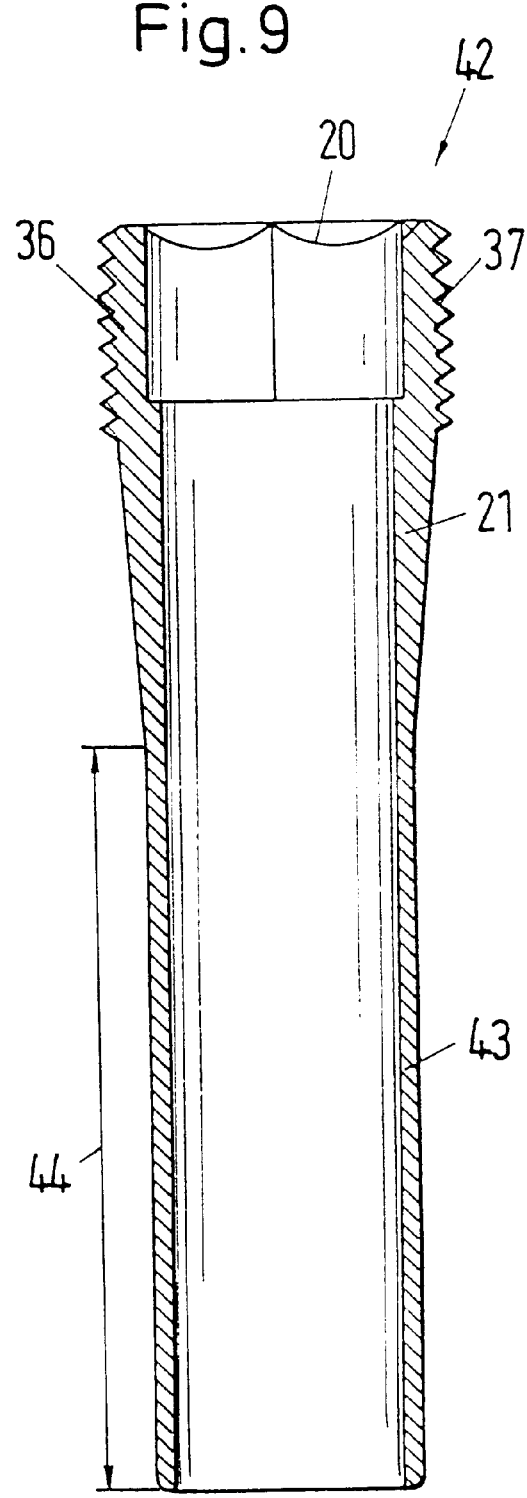

COMPOSITE PRESSURIZED CONTAINER WITH A PLASTIC LINER FOR STORING GASEOUS MEDIA UNDER PRESSURE

BACKGROUND OF THE INVENTION

1. Field of the Invention

The invention relates to a composite pressure vessel with a plastic liner for storing gaseous media under pressure.

2. Discussion of the Prior Art

EP European reference 0 753 700 A1 discloses a composite pressure vessel forming the generic type. It comprises a plastic liner having two neck pieces arranged in the neck region, and having a winding of a fiber composite material that reinforces the liner. At least one neck piece is designed in such a way that it can accommodate a screw-in valve having a cylindrical or conical thread. Both neck pieces are provided, in the end region facing the pressure vessel, with a flat, frustoconical collar which is surrounded on the inside by the liner and on the outside by the reinforcing winding. In the region facing the liner, both neck pieces have an internally threaded section which interacts with an externally threaded section arranged on that region of the liner which is designed as the neck. The neck piece that accommodates a valve has, on the inside in the thread-free region adjacent to the internally threaded section, an annular groove to accommodate a sealing element. This is adjoined by a further internally threaded section to accommodate the valve. As a safeguard against rotation, the neck piece that accommodates the valve is provided with a wrench attachment on the outside.

This design is only partially suitable to meet the special requirements which are placed on pressure vessels having a filling pressure up to 300 bar. This applies in particular to the sealing in the neck region and to impact stressing of this region.

SUMMARY OF THE INVENTION

The object of the invention is to provide a composite pressure vessel with a plastic liner for storing gaseous media under pressure which, at a test pressure of up to 450 bar, for example, satisfies the licensing requirements with regard to leakage even following impact stressing.

The core of the invention is the specific improvement of the sealing in the critical neck region. This includes the arrangement of a screw-in clamping ring, whose frustoconical section interacts with that end region of the liner that projects into the neck piece. This end region of the liner preferably has a bevel corresponding to the frustoconical section of the clamping ring. If required, this section can also be cylindrical. The entire section is produced by boring out the neck, accommodating the valve, of the plastic liner. When delivered, this neck generally has only a small venting hole, which is kept open during the production of the liner. Selecting the angle in the range between 3 and 5° means that the screwing-in force is subdivided into a very low axial component and, for this purpose, a radial component which is all the larger. The result of this is that the end region of the liner is pressed into the threaded contour of the screwed-on neck piece. In this case, it is advantageous that the critical end region of the liner makes contact under tension not only at high internal pressures but also at a low filling pressure. The magnitude of the prestress can be adjusted by screwing in the clamping ring to a greater or lesser depth. The prestress generated in this way counteracts the thermal expansion or contraction of the liner in relation to the neck piece. In order to be able to screw the clamping ring in a straightforward way, it has an internal hexagon, so that defined torques can be applied and, by calculation, the necessary flank pressure of the clamping ring can be reproduced.

Depending on the type of gas filling and, in particular, on the filling cycles, the arrangement of a modified clamping ring has proven to be advantageous. During daily filling with natural gas, as is customary in the case of city buses with natural-gas propulsion, large quantities are forced into the vessel in a short time in order to keep the filling operation short. Because of the energy of compression, this leads to the filling duct being heated. In order to protect the sensitive plastic liner from this heating, a cylindrical section, which extends into the interior of the vessel, adjoins the frustoconical section of the clamping ring. This prevents the heated gas in the narrow filling duct coming directly into contact with the liner, and the plastic liner connected to the neck piece is protected against the action of heat. If necessary, during such a filling operation, the valve connection can be cooled from the outside.

For valves with an upstream ceramic filter cartridge, such as is provided, for example for air to be breathed, the clamping ring has a clear width of at least 6 mm. As a rule, a clear width of 8–10 mm is necessary in order that the sometimes bent filter cartridge can be screwed in without difficulties.

A further aspect of the invention relates to arranging a sealing element in the neck region. In the known design from the prior art, the sealing element is arranged on the front side of the end region of the liner. However, a large number of trials and investigations have shown that the matching of the tolerances between the neck region of the liner and that of the neck piece is to be viewed as critical. The production of the liner is possible with only a large tolerance, because of the process, so that in the least favorable case a gap between the liner and neck piece has to be bridged. The screw-in clamping ring certainly provides a certain degree of compensation, but on the other hand limits are placed on the screwing-in force, otherwise the neck region of the liner would be destroyed. For this reason, it is proposed to arrange, in the thread-free section of the neck region of the liner, a sealing ring which is anchored in a groove which extends radially into the neck piece. For particularly critical cases, it has proven to be beneficial if a further sealing ring is additionally arranged on the underside of the collar of the neck piece. This has the advantage that, in the event of superimposed thermal and mechanical stressing, in particular impact stressing in the axial direction, possible leakage as a result of loosening the joint between the liner and neck piece in the collar region can be counteracted by the sealing ring. In order to improve the attachment between the neck piece and the plastic liner further, it is additionally proposed to make provision to arrange an adhesive between the underside of the collar of the neck piece and that region of the liner which makes contact with it.

With regard to impact stressing, arranging an external bead in the region adjacent to the collar has proven to be advantageous. This bead ensures that a large part of the impact stress which is incident on the neck piece is led into the winding, and only a remainder reaches the liner region via the collar. Otherwise, it is possible that the liner region will be so severely stressed, by the impacting neck piece, that it will tear locally. The arrangement of an impact-absorbing layer on both polar caps of the pressure vessel also acts with the same effect. Preferably, a rapidly curing polyurethane foam is used for this purpose. This can also be used to form a standing surface in the polar cap opposite the valve, so that the vessel can be placed upright without aids. This standing surface can be designed as a flat disk or as a foot ring.

Depending on the application, it may be necessary to screw in a valve with a standardized conical thread. In order for it to be possible to continue to screw in the clamping ring, the upper internally threaded section is subdivided into two sections. The first section is a cylindrical fine thread to accommodate the clamping ring, and this is adjoined, with an offset, by the standardized conical thread to accommodate the valve.

Overall, the result of the measures proposed is that the developed pressure container satisfies the licensing conditions at a test pressure up to 450 bar and can optionally be used for filling with a very wide range of gases, be it air to be breathed, natural gas, hydrogen or any other.

BRIEF DESCRIPTION OF THE DRAWINGS

The composite pressure vessel constructed in accordance with the invention is explained in more detail in the drawing with reference to an exemplary embodiment. In the drawing:

FIG. 5 shows the valve neck piece in a half longitudinal section and in a half elevation;

FIG. 6 shows the bottom neck piece in a half longitudinal section and in a half elevation;

FIG. 7 shows a variant of the valve neck piece in a half longitudinal section;

FIG. 8 shows a longitudinal section of one embodiment of a clamping ring; and

FIG. 9 shows the same as FIG. 8, but a variant of a clamping ring.

DETAILED DESCRIPTION OF THE PREFERRED EMBODIMENTS

Figure 1:
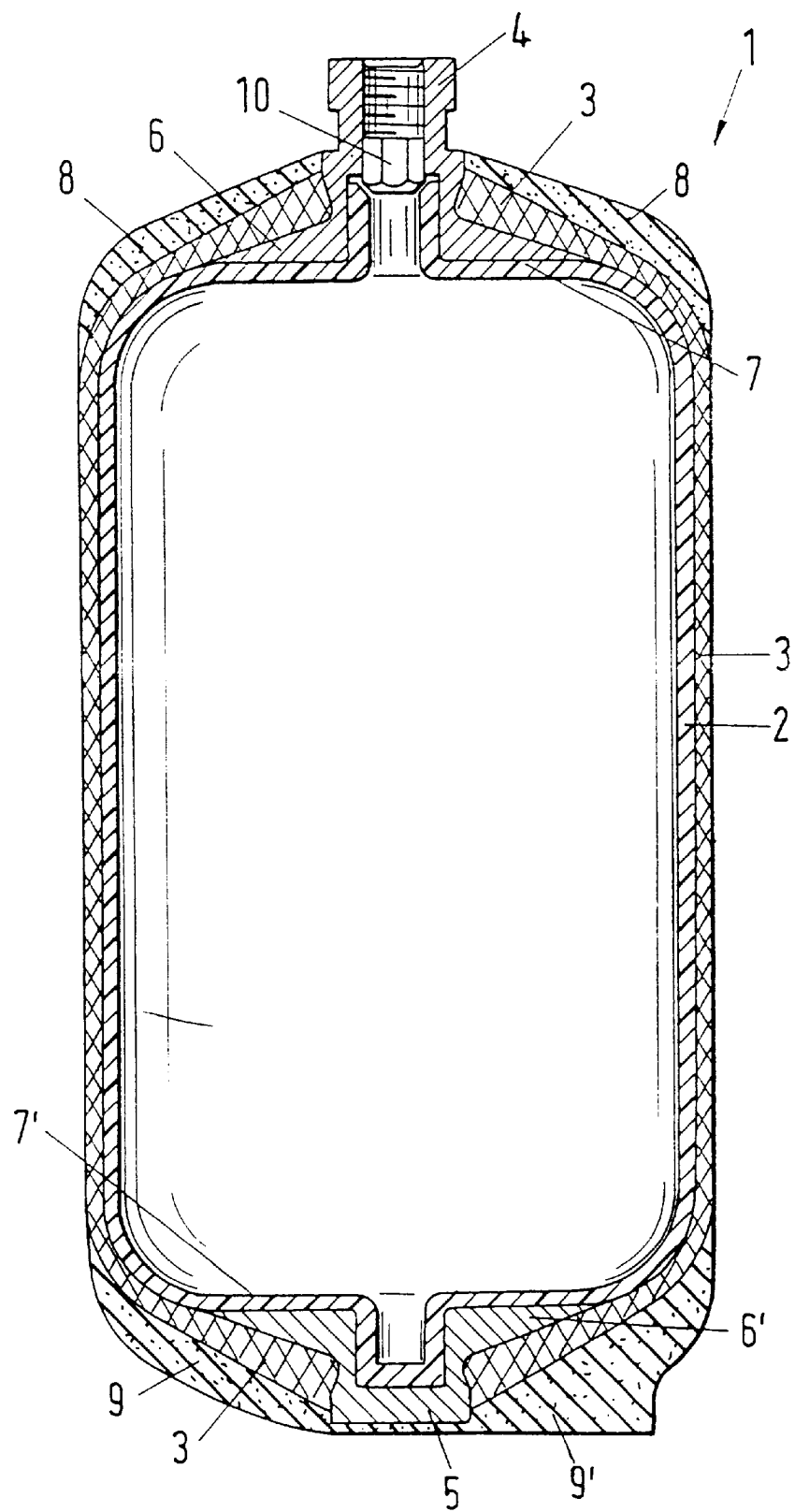
FIG. 1 shows a longitudinal section of a composite pressure vessel constructed in accordance with the invention.

FIG. 1 illustrates a longitudinal section of a composite pressure vessel 1 constructed in accordance with the invention. It comprises a plastic liner 2 produced by blow-forming or rotational sintering processes or thermoforming processes, which is reinforced by a fiber winding 3 wound on from the outside. For example, the reinforcing winding 3 comprises a fiber reinforcement, such as carbon, aramide, glass, boron, $Al_2O_3$ fibers or mixtures (hybrid yarns) thereof, which are embedded in a matrix of thermosetting polymers, for example epoxy or phenol resins etc., or in thermoplastic polymers, for example PA12, PA6, PP etc. The fiber composite material, comprising the above-mentioned fibers and polymers, is applied both in the axial and in the tangential direction of the vessel, that is to say the fiber reinforcing element (FRE) or the alignment of the fiber longitudinal axes exhibit only a small angle (0–70°) with respect to the vessel longitudinal axis when they are wound axially in the cylindrical vessel part. The polar caps of the plastic liner 2 are also wound uniformly with the aid of axial winding. Prior to, alternating with or following this polar-cap winding, the fiber reinforcing element is applied exclusively tangentially or in the circumferential direction of the cylindrical vessel part. The wall-thickness components of the tangential winding and axial winding depend on the external diameter of the plastic liner 2, on the strength of the fiber reinforcing element, on the winding angles etc. In the neck region, the composite pressure vessel 1 has openings, which are each closed and/or sealed off by a neck piece 4, 5. Details of the neck pieces 4, 5 will be explained in more detail in FIGS. 5–7. Both neck pieces 4, 5 have, in a known way, a frustoconical collar 6, 6' on the underside 7, 7' of which the liner 2 comes to bear. According to the invention, both polar caps of the composite pressure vessel 1 are covered by an impact-absorbing layer 8, 9, 9'. This layer 8, 9, 9' is preferably composed of polyurethane foam. It is advantageous for the polar cap located opposite the valve region to be constructed as a standing surface 9', as can be seen here on the right-hand side of the figure at the bottom. This standing surface 9' can be constructed, as illustrated here, as a flat disk or as a foot ring.

In order to improve the sealing in the neck region, a clamping ring 10 is screwed into the neck piece 4 that accommodates the valve (not illustrated here). Details relating to this are illustrated in FIG. 4.

Figure 2:
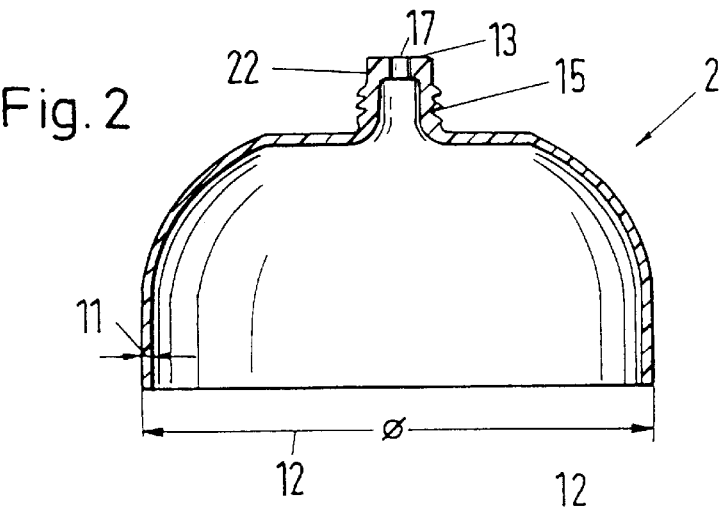
FIG. 2 shows a partial longitudinal section of the liner (valve region)
Figure 3:
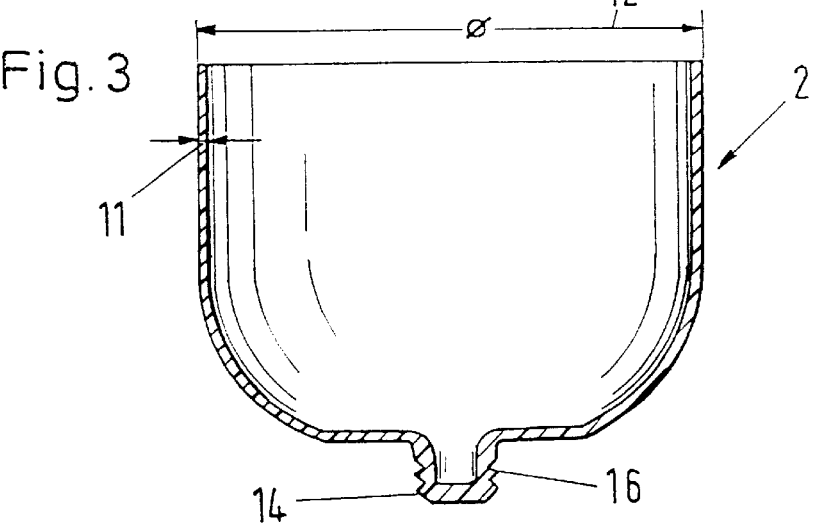
FIG. 3 shows a partial longitudinal section of the liner (bottom region)

FIGS. 2 and 3 show the plastic liner 2 in partial longitudinal section. Its dimensions are essentially determined by the thickness 11 and the external diameter 12. In a known way, the liner 2 is constructed as a neck 13, 14 in the end regions. In order for the neck pieces 4, 5 to be screwed on, the respective neck 13, 14 of the liner 2 is provided with a threaded section 15, 16. The thread 15, 16 is preferably designed as a sawtooth thread, for example KS 25 pitch 4 to DIN 6063 Part 1 and Part 2. It should further be mentioned that the neck 13 accommodating the valve is provided with a hole 17, while the opposite neck 14 is closed and thus does not provide any sealing problems.

Figure 4:
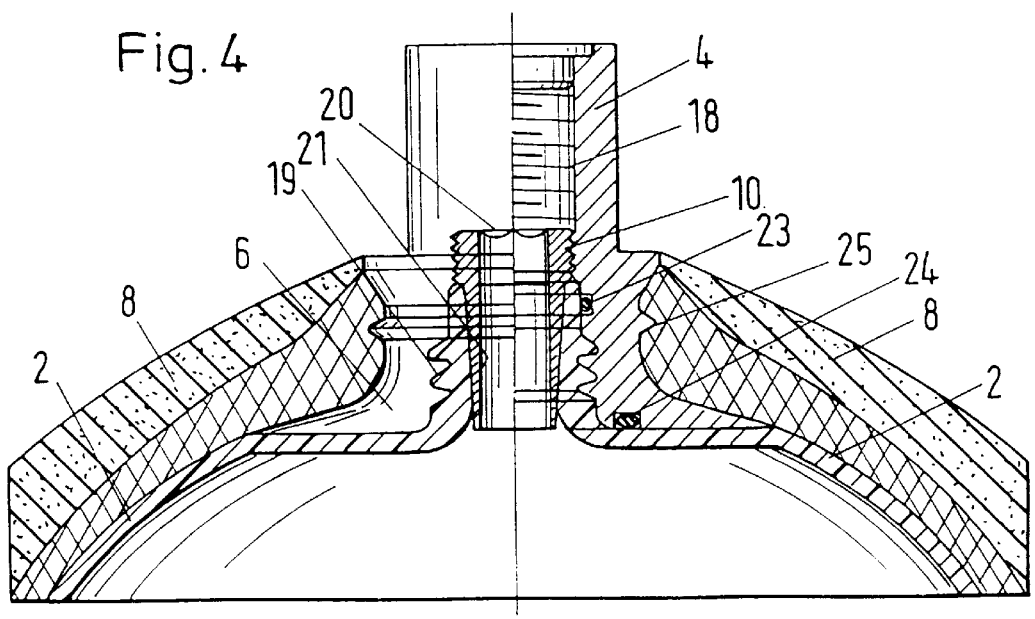
FIG. 4 shows a longitudinal section on an enlarged scale of the valve region in the wound state.

FIG. 4 shows the neck region of the composite pressure vessel 1 on the valve side, on an enlarged scale. The details of the connection can be seen better in this illustration. The neck piece 4 that accommodates the valve is provided on the inside with two threaded sections 18, 19, of which the upper threaded section 18 in this embodiment is designed as a cylindrical thread, in order to accommodate the clamping ring 10 and to accommodate the valve (not illustrated here). The lower threaded section 19 located underneath is the mating piece for the external thread 15 of the neck 13 of the liner 2. By screwing in the clamping ring 10 by means of the internal hexagon 20 (see FIG. 8 or 9), the neck 13 of the liner 2 is pressed into the threaded contour 19 of the neck piece 4 via the frustoconical section 21. As a further sealing measure, a sealing ring 23 is arranged in the thread-free section 22 (FIG. 2) of the neck 13. If necessary, a further sealing ring 24 can additionally be arranged on the underside 7 of the collar 6. In order to improve the load-bearing capacity under impact stress, provision is made to arrange a circumferential bead 25 on the outside of the neck piece 4. Additionally, if desired, an adhesive can be provided between the underside of the collar of the neck piece and the region of the liner which contacts the underside of the collar.

FIGS. 5, 6 show the two neck pieces 4, 5 in a half longitudinal section and a half elevation. In order to accommodate the two sealing rings 23, 24 mentioned in the previously explained FIG. 4, appropriate grooves 26, 27 are provided in the neck piece 4. The first-mentioned groove 26 is arranged between the two internally threaded sections 18, 19; the second-mentioned groove 27 is arranged on the underside 7 of the collar 6. The neck piece 5 opposite the valve is of comparable construction. It likewise has an internally threaded section 19' to be screwed onto the neck 14 of the liner 2 (FIG. 3). It is preferably likewise designed as a sawtooth thread. A circumferential bead 25' is likewise provided on the outer face of the neck piece 5, in order to damp the impact stress.

As delivered, the neck piece 5 at the bottom also has a spigot 28, which is provided with an external thread 29. The spigot 28 is used as a receiver for a holding device when the fiber composite material is being applied to the liner 2. As FIG. 1 shows, following the application of the fiber winding, this spigot 28 is cut off before the impact-absorbing layer 9, 9' is applied.

FIG. 7 illustrates a variant of a neck piece 30 that accommodates the valve. As distinct from the neck piece 4 illustrated in FIG. 5, the upper internally threaded section is subdivided into two sections. The first section 31, like the section 18 in FIG. 5, is provided with a cylindrical thread to accommodate the clamping ring 10. This is adjoined, with an offset 32, by a standardized conical threaded section 33. This variant is necessary since, depending on the gas filling and supplier, it is also possible for valves with a conical screw-in thread to be prescribed. A further difference relates to the design of the collar 34. As distinct from the design in FIGS. 5 and 6, the collar 34 of the neck piece 30 is oriented obliquely upward. Depending on the bottom or shoulder form of the liner 2, more favorable stress relationships in the component are achieved by this inclination. The angle 39 of this bevel preferably lies in a range of 5–10°.

FIG. 8 shows a first embodiment of a clamping ring 10 in longitudinal section. It has a cylindrical section 36 with an external thread 37 to be screwed into the respective neck piece 4, 30. This is adjoined, with a rounded portion 38, by a frustoconical section 21. The angle 40 lies in the range between 3 and 5°. The clear width 41 of the clamping ring 10 is also important. This must not be chosen to be too small, in order that, for example, a valve prescribed for air to be breathed and having an upstream filter cartridge can be screwed in. The dimension should not fall below 6 mm, 8 mm is expedient, in order for it to be possible for curved or bent filter cartridges to be screwed in without problems.

Figure 9 shows a variant 42 of the configuration of the clamping ring, identical reference numbers having been chosen for identical parts. The frustoconical section 21 already mentioned is adjoined by a cylindrical section 43, which is expediently constructed as a tube. The length 44 of this section 43 is chosen such that, after it has been screwed in, the front region of the clamping ring 42 projects into the interior of the vessel. This has an advantageous effect if filling is associated with severe heating and the liner 2 is to be protected against this.

The invention is not limited by the embodiments described above which are presented as examples only but can be modified in various ways within the scope of protection defined by the appended patent claims.

What is claimed is:

1. A composite pressure vessel for storing gaseous media under pressure, comprising: a plastic liner having two ends each with a neck; two neck pieces arranged in the neck region at each end of the liner; a winding of a fiber composite material that reinforces the liner, at least one of the neck pieces being configured to accommodate a screw-in valve having a thread, both neck pieces having a flat, frustoconical collar which is surrounded on an inner side by the liner and on an outer side by the reinforcing winding, each neck piece having an internally threaded section in a region facing the liner which interacts with an externally threaded section arranged on the neck of the liner, the neck piece that accommodates a valve having an internal thread-free region adjacent to the internally threaded section, which thread-free region has an annular groove and is adjoined by a further internally threaded section to accommodate the valve, the neck piece that accommodates the valve being provided with an external wrench attachment; a sealing element arranged in the annular groove; and a clamping ring screwed into the neck piece that accommodates the valve, the clamping ring having an outer circumference with a threaded section which is adjoined by a thread-free, frustoconical section, the annular groove arranged between the internally threaded sections of the neck piece to accommodate the sealing ring extending radially into the neck piece, each respective neck piece having at least one bead on an outer side in a region adjoining the collar, which bead extends radially outward over an entire circumference of the neck piece.

2. A composite pressure vessel as defined in claim 1, and further comprising an impact-absorbing layer provided at polar caps of the pressure vessel.

3. A composite pressure vessel as defined in claim 2, wherein a polar cap opposite the neck piece that accommodates the valve is formed as a standing surface.

4. A composite pressure vessel as defined in claim 2, wherein the impact-absorbing layer consists of polyurethane foam.

5. A composite pressure vessel as defined in claim 1, wherein the frustoconical section of the clamping ring interacts with the neck of the liner, which neck has a corresponding bevel arranged on an inside of the liner.

6. A composite pressure vessel as defined in claim 1, wherein the clamping ring has an internal hexagon and the threaded section is designed as a fine thread.

7. A composite pressure vessel as defined in claim 1, wherein the clamping ring has a cylindrical section that adjoins the frustoconical section and extends into an interior of the vessel.

8. A composite pressure vessel as defined in claim 1, wherein the clamping ring has a clear width of at least 6 mm.

9. A composite pressure vessel as defined in claim 1, wherein the frustoconical section of the clamping ring has an angle in a range from 3–5°.

10. A composite pressure vessel as defined in claim 1, wherein the neck piece that accommodates the valve has another annular groove on an underside of the collar, and further comprising a sealing ring arranged in the another annular groove.

11. A composite pressure vessel as defined in claim 1, wherein the collar has an edge region oriented obliquely upward.

12. A composite pressure vessel as defined in claim 11, wherein the edge region is angled in a range from 5–10°.

13. A composite pressure vessel as defined in claim 1, wherein the external thread on the neck of the liner and the internal thread of the neck piece are designed as sawtooth threads.

14. A composite pressure vessel as defined in claim 1, wherein the internally threaded section that accommodates the valve on the neck piece is subdivided into a section with a cylindrical fine thread to accommodate the clamping ring, and a section offset therefrom and having a conical thread to accommodate the valve.

15. A composite pressure vessel as defined in claim 1, and further comprising an adhesive between an underside of the collar of the neck piece and a region of the liner which makes contact with the underside of the collar.

* * * * *